United States Patent [19]

Bier

[11] Patent Number: 4,642,165

[45] Date of Patent: Feb. 10, 1987

[54] METHOD OF VAPORIZING MULTICOMPONENT LIQUIDS

[75] Inventor: Mark E. Bier, Pittsburgh, Pa.

[73] Assignee: American Sterilizer Company, Erie, Pa.

[21] Appl. No.: 684,461

[22] Filed: Dec. 21, 1984

[51] Int. Cl.⁴ .............................................. B01D 3/42
[52] U.S. Cl. .......................................... 203/12; 203/1;
203/88; 203/91; 202/205; 222/456; 422/27; 422/28
[58] Field of Search ..................... 203/12, 1, 88, 91, 3;
73/863.12; 222/454, 456, 1; 239/99, 101, 102;
137/1; 202/205; 422/27, 28

[56] References Cited

U.S. PATENT DOCUMENTS

| | | | |
|---|---|---|---|
| 922,629 | 5/1909 | Priestman | 239/99 |
| 1,656,433 | 1/1928 | Gaines | 239/99 |
| 2,169,128 | 8/1939 | Schmidt | 203/6 |
| 2,364,264 | 12/1944 | Yeomans | 239/99 |
| 2,369,900 | 2/1945 | Jennings et al. | 422/27 |
| 2,576,976 | 12/1951 | Stagner | 239/99 |
| 2,934,693 | 4/1960 | Reinecke et al. | 73/29 |
| 2,960,448 | 11/1960 | Straub et al. | 203/1 |
| 2,990,341 | 6/1961 | Graybill | 203/12 |
| 3,061,198 | 10/1962 | Kerr et al. | 239/99 |
| 3,258,174 | 6/1966 | Mullen | 222/456 |
| 3,661,527 | 5/1972 | Eggertsen et al. | 73/29 |
| 3,985,624 | 10/1976 | Prevost et al. | 203/1 |
| 4,458,541 | 7/1984 | Deming et al. | 73/863.11 |
| 4,489,750 | 12/1984 | Nehring | 239/99 |

FOREIGN PATENT DOCUMENTS 0314302  6/1929  United Kingdom ................ 222/454

Primary Examiner—S. Leon Bashore
Assistant Examiner—V. Manoharan
Attorney, Agent, or Firm—Robert D. Yeager; Christine R. Ethridge; George D. Dickos

[57] ABSTRACT

A method of vaporizing a multicomponent liquid, such as a hydrogen peroxide and water solution, for injection into a vacuum chamber including the steps of metering successive predetermined increments of the liquid at a predetermined rate onto a heated surface in a vaporization chamber. Upon exposure to the heated surface, each liquid increment is substantially instantaneously vaporized before the next succeeding liquid increment is metered onto the heated surface to produce a multicomponent vapor increment having substantially the same weight percent composition as the multicomponent liquid increment. Each vapor increment is passed into the vacuum chamber.

5 Claims, 1 Drawing Figure

METHOD OF VAPORIZING MULTICOMPONENT LIQUIDS

BACKGROUND OF THE INVENTION

1. Field of the Invention

The present invention relates to methods of vaporizing liquids, and more particularly, to a method of vaporizing a multicomponent liquid.

2. Description of the Prior Art

Hawkinson, et al. U.S. Pat. No. 2,491,732 which issued on Dec. 29, 1949, describes a method of vaporizing hydrogen peroxide. The liquid is sprayed in the form of finely divided droplets onto the walls of a vaporizer which are coated with a nonvolatile stabilizer for hydrogen peroxide and heated sufficiently to rapidly and completely vaporize the liquid sprayed onto the walls. The heated walls of the vaporizer must be inclined from the horizontal to ensure formation of a hydrogen peroxide film on the walls of the vaporizer.

The Hawkinson method is not compatable with sterilizer applications. A relatively large surface area is required to provide the desired efficiency. The vapor is transferred to another location for ultimate use. Although evaporation of the hydrogen peroxide and water is simultaneous in the vaporizer, the water vapor travels faster than the hydrogen peroxide vapor, thus the vapors reaching the area of end use are not in the same concentration as the initial solution.

U.S. Pat. Nos. 4,169,123 and 4,169,124 to Moore et al. and Forstrom et al., respectively, describe sterilization techniques using gaseous hydrogen peroxide. A hydrogen peroxide and water solution is vaporized in a closed sterilization chamber. The vapors are permitted to contact the items to be sterilized to achieve sterilization.

In these prior art sterilizer methods, water is vaporized more quickly than hydrogen peroxide and thus, the water vapor reaches the items to be sterilized first and in higher concentrations. The water vapor becomes an effective barrier to hydrogen peroxide penetration around small crevices and lumens of the items in the sterilizer.

When vaporizing multicomponent liquids, particularly those having components of significantly differing boiling points, the more volatile liquid will vaporize first. According to Raoult's Law, the vapor pressure of a component in a binary solution is equal to its pure vapor pressure multiplied by the mole fraction of a particular constituent. For nonideal solutions, an activity coefficient must also be factored in. Thus, $$P_A = X_A P_A^\circ \gamma_A$$

Where $P_A$ is the vapor pressure of component A;
$X_A$ is equal to the mole fraction of A in the mixture;
$P_A^\circ$ is the vapor pressure of pure A; and
$\gamma_A$ is the activity coefficient for A in the solution.

Where A is, for example, hydrogen peroxide in a water solution, the pure vapor pressure of water is greater than that of peroxide, thus, the vapor pressure of the water component in the binary solution will be greater than that of the peroxide unless the mole fraction of peroxide in the solution becomes very large. The handling requirements for highly concentrated hydrogen peroxide solutions are so onerous because of the hazardous nature of the peroxide that maintaining such solutions is impractical.

There is a need for a method of vaporizing multicomponent liquids, particularly those having components of significantly differing volatilities, which provides a multicomponent vapor of substantially the same percent weight composition as the multicomponent liquid which is compatible with sterilizer practice. There is a further need for such a method which will permit the use of safe concentrations of the constituent components.

SUMMARY OF THE INVENTION

The present invention provides a method of vaporizing a multicomponent liquid by injection into a vaporization chamber in open communication with a vacuum chamber. The method includes the step of metering successive predetermined increments of the multicomponent liquid at a predetermined rate onto a heated surface of the vaporization chamber wherein each liquid increment is substantially instantaneously vaporized before the next succeeding liquid increment is metered onto the heated surface. Each such liquid increment vaporization produces a multicomponent vapor increment having substantially the same weight percent composition as the multicomponent liquid increment. Each vapor increment is passed into the vacuum chamber.

The method may also include the step of heating the surface of the vaporization chamber at a rate that replaces the heat lost to vaporizing each liquid increment before the next succeeding liquid increment is metered onto the surface.

The surface is preferably made of a relatively high thermal conducting material and the multicomponent liquid may be a binary composition, for example hydrogen peroxide and water.

BRIEF DESCRIPTION OF THE DRAWINGS

The FIGURE is a diagrammatic view of an apparatus for use in carrying out the present invention.

DETAILED DESCRIPTION OF THE PREFERRED EMBODIMENT

Figure 1:
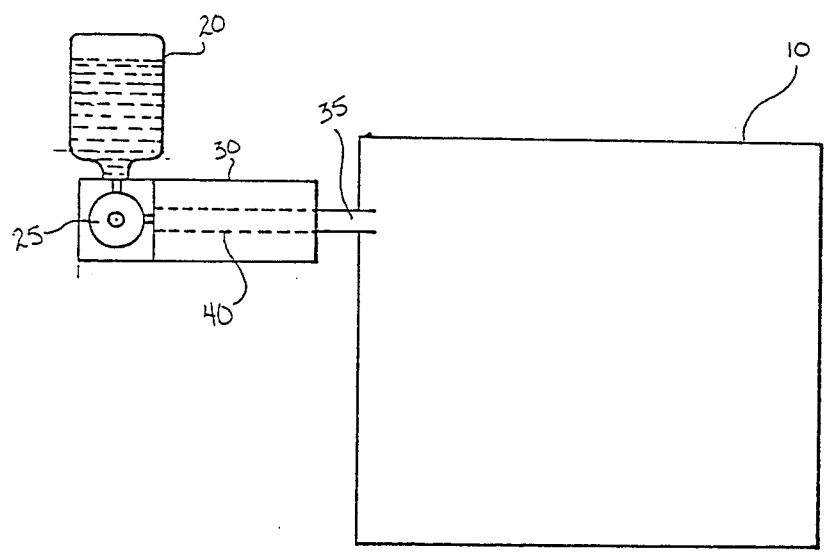

Referring to the single FIGURE, there is shown in diagrammatic form apparatus for use in carrying out the method of the present invention. The apparatus includes a vacuum chamber 10, a vaporization chamber 30, and a liquid reservoir 20. A valve 25 meters the liquid onto the heated surface 40 of the vaporization chamber 30. The vaporization chamber 30 is in open communication, through portal 35 with the vacuum chamber 10.

The present invention can be practiced with any suitable multicomponent liquid. For purposes of the detailed description, however, the preferred multicomponent liquid is a binary composition of hydrogen peroxide ($H_2O_2$) and water ($H_2O$). The peroxide constitutes about 20 to 50% by weight of the composition. Although concentrations of hydrogen peroxide greater than 50% are possible, the hazardous nature of the material makes such high concentrations impractical. Lower concentrations of the peroxide below 20% are generally accompanied by increased problems with the water.

The method of the present invention minimizes the barrier created by the more volatile component, water, by metering small, ideally infinitesimal increments of the multicomponent liquid repeatedly into the vaporization chamber 30 at such a rate that each liquid increment is vaporized before the next succeeding liquid increment is metered into the chamber 30. A homogenous vapor, having a percent weight composition substantially the same as the multicomponent liquid is produced and passed through portal 35 into the vacuum chamber 10. The small vapor increments reach the items in vacuum chamber 10 and penetrate the crevices and lumens as a homogenous vapor.

The vaporization chamber 30 may be constructed from passivated stainless steel, aluminum, or alloys of aluminum which are compatable with hydrogen peroxide. When other multicomponent liquids are vaporized, different materials may be suitable. Chamber 30 is structured to ensure contact between each metered liquid increment and the heated surface 40. A vaporizer having a 25 cm long chamber made from $\frac{1}{8}$ inch pipe in a horizontal position, was found to be one suitable size.

The surface 40 of the chamber 30 may be heated by any suitable known means. The surface 40 must be made of a relatively high thermal conducting material and must be supplied with sufficient heat to replace the heat lost with each liquid increment vaporization before the next succeeding liquid increment is metered onto surface 40. The vaporization process consumes about 95% of the required heat. A typical energy requirement for a hydrogen peroxide sterilizer is at least 40 watts to vaporize 30% peroxide solution at a rate of 15 microliters per second. The temperature of the surface 40 is preferably maintained at around 90° to 130° C. for a hydrogen peroxide sterilizer having a sterilization chamber temperature of about 55° C.

Metering the multicomponent liquid from reservoir 20 to the vaporization chamber 30 may be achieved by means of a three way ball valve 25. The valve 25 must be modified to deliver discrete increments of liquid at a predetermined rate onto the surface 40. Any suitable valve which can meter the desired amounts of liquid at the desired rate will suffice. A typical increment of hydrogen peroxide and water may be between about 0.1 to 10 ul for each revolution of the ball valve 25. The rate of delivery may be about $\frac{1}{2}$ to 5 revolutions of the ball valve 25 per second. For a sterilization process, the total delivery of the required amount of vapor may be completed in about five minutes. The small delivery of the multicomponent liquid per unit time allows continuous rapid homogenous vaporization.

Alternative apparatus structure, increment size, rate of delivery and temperatures may vary, provided a suitable combination of the following parameters is achieved: vaporization rates of the components, atmospheric pressure inside the vacuum chamber, heat availability, surface area to volume ratio of the liquid to contact the heated surface, the conductivity of the heated surface, the temperature of the heated surface and the rate of liquid injection onto the surface.

The rate at which the components vaporize determines how rapidly the liquid can be introduced into the vaporizer. The rate of vaporization increases with increasing temperature, increasing contact surface area, and decreasing gas pressure. The present method intends that each increment of liquid is completely vaporized before the next increment is delivered to the heated surface. The vaporization rate of the least volatile component is the rate-limiter.

The vacuum chamber pressure can affect the vaporization rate and the rate at which vapor transfers from the vaporization area to the vacuum chamber. In the hydrogen peroxide sterilizer, the pressure of air needs to be as low as possible. With the peroxide sterilizer, a sufficiently low air pressure is less than or equal to about 30% of the total pressure arising from injected peroxide and water. The amount of peroxide solution injected should not exceed the saturation level, or about 35 mm Hg at 55° C. Thus, for the peroxide sterilizer application, the initial air pressure should be 10 mm Hg or less.

Heat is required to heat the liquid to the flashing temperature, and to vaporize the liquid. As stated above, the vaporization process consumes about 95% of the required heat. In order to maintain rapid vaporization, heat consumed by vaporization must be replaced before the temperature of the liquid falls significantly. The design of the vaporizer must assure intimate contact between the incoming liquid and the heated surface.

The greater the surface area of a liquid, the more evaporation sites there are. The thinner the film of liquid on a heated surface, the more rapidly the heating of the liquid proceeds. Thus, the larger the surface area to volume ("S/V") ratio of the liquid on a heated surface, the more rapid the vaporization rate. The concept of the present invention ensures a large S/V ratio by injecting small increments into the vaporization chamber. Several increments will not combine into larger, lower S/V ratio amounts, because each increment is allowed to vaporize before the next increment is injected. Typical increment sizes for a peroxide sterilizer may range from 0.1 to 10 microliters.

The heated surface available for contact by the liquid must be large relative to the vacant space in the vaporization chamber tube, to ensure that no liquid traverses the chamber without being vaporized. For a tubular design, this means that the path length must be large relative to the diameter and/or that the path must be tortuous. One simple, yet successful, configuration for a peroxide sterilizer is 25 cm long, 5 mm ID tube oriented horizontally. The path is definitely non-tortuous, but flow is apparently turbulent enough to ensure sufficient liquid contact with the vaporizer surface. Other more complicated designs could be used.

The material of the vaporizer surface must have a sufficiently high thermal conductivity to deliver heat to liquid at a rate which will balance or exceed the heat consumed by vaporization. Stainless steel, aluminum, or aluminum alloys are suggested.

The temperature of the liquid depends on the initial temperatures of the liquid and the heated surface, the heat capacity of the liquid, and the balance between heat consumed by vaporization and the rate at which heat flows to the contact area from remote locations in the surface material.

The initial temperature of the surface should be high enough to instantaneously raise the temperature of the incoming liquid to the boiling temperature of the least volatile component, to provide a sufficiently rapid rate of vaporization, and to provide a vapor which is higher in temperature than the sterilizer chamber to which it is sent. It must not be so high, however, that the degradation of any component (e.g. hydrogen peroxide) is significant. For the peroxide sterilizer, the range of useful temperatures could be from about 80° to 130° C.

The permissable rate of liquid injection is dependant on all of the above parameters. It cannot be faster than the system can vaporize one injection increment. The smaller the size of the injection increment the thinner the film of liquid can be and the more rapid the vaporization will be. The other parameters of the system can be designed to handle the desired injection rate. For a peroxide sterilizer with a tubular vaporization chamber, injection rates of 0.1 to 1 ml per minute have proved to be useful during trial runs.

Several experimental vaporization runs are reported below. Because of the interdependence of the several operating parameters, the ranges for any one parameter described below are illustrative only, and are not intended as limitations. Furthermore, the entire stated range of any one parameter may not necessarily be the best choice for every combination of the other parameters. Those skilled in the art will recognize that several optimum combinations can be achieved and that a particular value for any parameter can be predetermined with a minimum amount of effort.

The general experimental setup was a cylindrical tube, wrapped with an electric heating tape, and connected to a hole in the sterilizer door. A variable voltage transformer provided power to the heating tape. A thermocouple monitored the temperature of the vaporization chamber tube wall. This configuration was very flexible. The parameters which were varied include initial temperature, heat available to the tube (and to the incoming liquid), rate of injection of liquid, and the length, wall thickness, internal diameter (ID) and material of the tube. The experimental system did not allow accurate estimation of the respective fractions of the heater energy that were delivered to the vaporizer surface and lost to the environment. Thus, the heat energy is not given in any of the tables below. Instead, the electrical voltage applied to the heater is given, to permit qualitative comparison of the heat available to the vaporizers.

The relative success of vaporization chamber configurations was assessed by determination of the penetration of peroxide vapors to the center of 2 mm ID, 32 cm long glass tubes. The peroxide reaching the center of the tube was absorbed in a paper strip. Later the peroxide was extracted from the strip and measured colorimetrically.

Penetration of tubes is sensitive to the amount of peroxide reaching the tube and to interference by other vapors reaching the tube before peroxide. Thus, it is a measure of the combined effects of completeness of flashing the liquid, the degree of peroxide degradation, and the homogeneity of the vaporization of the liquid peroxide/water mixture.

The availability of heat to the injected liquid is the summarizing quality of a successful vaporizer. It results from the combination of the other parameters. In Table 1 the influence of heater voltage is demonstrated with two vaporizers of different geometries and materials. In both cases, the higher heater power effects better penetration. The rate and completeness of vaporization is improved when greater heat is available. The first vaporizer requires a higher heater voltage than the second to accomplish the same penetration. The first vaporizer is thin-walled, small in diameter, and has a low heat capacity. Less heat can be stored in the vaporizer prior to injection. More heat must be supplied by the heater during the injection. The second vaporizer is very thickwalled, can store more heat, has a larger ID, and was at a higher temperature at the time of injection. Although the two vaporizers differ greatly, heating conditions were found for each which resulted in similar penetration levels.

TABLE 1

Effect of Heat Availability on Vaporizer Efficiency

| INITIAL TEMP., °C. | FINAL TEMP., °C. | HEATER VOLTAGE | PENETRATION ug $H_2O_2$ |
|---|---|---|---|
| STAINLESS STEEL TUBE, 13 cm long, 3 mm OD, 2 mm ID: | | | |
| 90 | 102 | 30–60 | 20–30 |
| 90 | 100 | 70 | 34–55 |
| 90 | 115 | 140 | 65–79 |
| ALUMINUM CYLINDER, 13 cm long, 50 mm OD, 10 mm ID: | | | |
| 90 | — | 35 | 19–59 |
| 102 | — | 40 | 48–68 |
| 90 | 102 | 100 | 74–86 |
| 110 | 114 | 100 | 67–86 |
| 110 | 115 | 100 | 76–88 |

Injection: 0.25 ml 90% peroxide at 10 ul/2 sec.

The effects of injection time and initial temperature of the flasher are shown by Table 2. The flasher used here was very short. Peroxide was injected downward, perpendicular to the tube axis, so the liquid splashed initially against one location on the wall of the tube. Heater voltages were lower and initial temperatures were higher than those in Table 1, because the heating tape was wrapped in several layers around the short flasher. The heater voltages tabulated here were required to maintain the starting temperatures.

The first entry in Table 2 shows that a 3-second injection period was too short to flash the liquid as effectively as longer periods. With the short flasher length, sufficient heat was not available. Some of the liquid may have passed to the sterilizer chamber without being vaporized. The second entry shows that spreading the injection over a 30-second period improved the flashing efficiency at the same initial temperature and heater voltage. The final two table entries demonstrate that similar efficiency can be achieved with shorter time periods and higher initial temperatures. The wide range of temperatures used in the successful tests suggests the degradation of the peroxide is not a factor here. If it were, the higher temperatures would have caused a noticeable decrease in the amount of peroxide penetrating the tubes.

TABLE 2

Effect of Injection Time and Temperature on Vaporizer Efficiency

| INITIAL TEMP., °C. | HEATER VOLTAGE | INJECTION PERIOD, sec | PENETRATION ug $H_2O_2$ |
|---|---|---|---|
| 120 | 45 | 3 | 57 ± 10 |
| 120 | 45 | 30 | 73 ± 2 |
| 155 | 50 | 15 | 83 ± 10 |
| 205 | 60 | 10 | 79 ± 6 |

Vaporizer stainless steel Tee, 5 cm long, 6 mm ID.
Injection = 0.25 ml 90% peroxide.
Penetration entries are the mean of 5 results, ±σ.

Too rapid an injection can result in a puddle of liquid forming in the vaporizer. As long as a puddle is present, water will be preferentially vaporized and peroxide will remain in the liquid phase. Subsequent liquid increments entering the vaporizer and joining the puddle will promote continuation of the inhomogeneous vaporization.

The data shown in Table 1 and Table 2 resulted from injections of 90% peroxide solutions. A more dramatic demonstration of the effect of puddle formation results from injection of weaker solutions. A 30% peroxide solution was used in tests summarized in Table 3. Injection of 0.7 ml of 30% peroxide in one second must have caused a puddle in the vaporizer, resulting in inhomogeneous vaporization, water vapors preceding the peroxide vapors to the tubes, and poor penetration of the tubes by peroxide. In contrast, incremental injection over a 150-second period (10 ul/2 sec), provided small bursts of homogeneous vapors, and resulted in much better penetration. Similar penetration has been achieved by incremental injection of 30% peroxide into a 25 cm long stainless steel vaporizer.

TABLE 3

Puddle Injection Compared to Incremental Injection

| INITIAL TEMP., °C. | HEATER VOLTAGE | INJECTION PERIOD, sec | PENETRATION, ug $H_2O_2$ |
| --- | --- | --- | --- |
| 88 | 100 | 1 | 19 ± 2 |
| 88 | 100 | 1 | 24 ± 1 |
| 88 | 100 | 150 | 38 ± 3 |
| 88 | 100 | 150 | 34 ± 5 |
| 88 | 100 | 150 | 34 ± 4 |

Vaporizer = glass tube, 10 cm long, 3 mm ID, in stainless steel sheath.
Injection = 0.7 ml 30% peroxide.
Pentration entries are the mean of 5 results, ±σ.

The penetration levels in Table 3 are lower than those in preceding tables, because the concentration of peroxide in the injection solution is much lower. Even with homogeneous vaporization, a 30% peroxide solution contains enough water to lower the concentration of peroxide which penetrates the tubes. However, even these lower concentrations are an improvement over those achieved by other methods.

Effective vaporization has been demonstrated with a variety of vaporizer tubes and operating conditions. Successful tube dimensions ranged from 5 to 25 cm in length, 2 to 10 mm ID, and 3 to 50 mm OD. Vaporizer materials were stainless steel, glass, and aluminum. Temperatures ranged from 90° to 205° C. Heater voltages ranged from 45 to 140 V. Injection periods ranged from 10 to 150 seconds. These are nonrestrictive examples of useful ranges for these parameters. Conditions outside of these ranges might also be effective. However, the success of a vaporizer depends on a proper combination of the several parameters. Not every combination of the parameters within these ranges will necessarily be successful.

What is claimed is:

1. A method of vaporizing a multicomponent liquid comprising:
   metering successive predetermined increments of said multicomponent liquid at a predetermined rate onto a heated surface of a vaporization chamber;
   substantially instantaneously vaporizing each said liquid increment on said heated surface before the succeeding said liquid increment is metered onto said heated surface so that each liquid increment vaporization produces a multicomponent vapor increment having substantially the same weight percent composition as said multicomponent liquid increment; and
   passing each said vapor increment into a vacuum chamber.

2. A method as recited in claim 1 further comprising heating said surface at a rate that replaces the heat lost to vaporizing each liquid increment before said next succeeding liquid increment is metered onto said surface.

3. A method as recited in claim 1 wherein said multicomponent liquid is a binary composition having components of significantly differing volatilities.

4. A method as recited in claim 3 wherein said binary composition is a hydrogen peroxide, water solution having a hydrogen peroxide concentration of about 20–50% by weight.

5. A method of vaporizing a multicomponent liquid comprising:
   metering a predetermined amount of the multicomponent liquid into a vaporization chamber;
   heating said amount of liquid on a surface of said vaporization chamber to substantially instantaneously raise the least volatile component of said multicomponent liquid to its boiling point to produce a multicomponent vapor having substantially the same percent composition as said amount of said multicomponent liquid;
   passing said multicomponent vapor into a vacuum chamber; and
   repeating for a predetermined period of time said metering, heating, and passing steps at a predetermined rate no greater than that required to substantially completely vaporize one said amount of liquid before metering the next said amount of liquid.

* * * * *